United States Patent [19]
Davis

[11] 3,826,115
[45] July 30, 1974

[54] BATTERY LOCKING DEVICE
[76] Inventor: B. T. Davis, 1029 Elm St., Waco, Tex. 76704
[22] Filed: Sept. 12, 1972
[21] Appl. No.: 276,849

[52] U.S. Cl................ 70/258, 70/230, 180/68.5
[51] Int. Cl................. E05b 73/00, H01m 1/04
[58] Field of Search........ 70/230, 258; 151/33; 180/68.5; 402/2, 62

[56] References Cited
UNITED STATES PATENTS
3,498,400  3/1970  Hysmith........................ 180/68.5
FOREIGN PATENTS OR APPLICATIONS
25,058  1912  Great Britain.................. 70/230

Primary Examiner—Albert G. Craig, Jr.

[57] ABSTRACT

The battery locking device, which I term Battery Watchman, is a device consisting of several pieces of metal that is designed and constructed in such a manner as to provide a method of conveniently and economically locking a motor vehicle battery in place. The Battery Watchman consists of a pair of holddown slides which are to be fitted into a retaining slide in such a fashion as to allow the holddown slides to be fitted over holddown bolts, which are a part of the standard equipment of an automobile, and to be secured by a pair of holddown nuts which are screwed onto the holddown bolts. Each holddown nut contains an opening thru which an adjustment rod is placed in such a manner as to provide for the securing of the battery.

2 Claims, 7 Drawing Figures

BATTERY LOCKING DEVICE

SUMMARY OF INVENTION

The device which is the subject matter of this application is constructed in such a manner as to allow it to be used in conjunction with, and not a substitute for, the now normally accepted methods adopted by manufacturers in placing and securing batteries in motor vehicles. It is designed in such a fashion that it can be used on any size, make or model of battery. Its installation is simple and requires no particular mechanical ability. The device is designed in such a manner that it can be used to secure a battery across its middle section or from end to end. The device does not seek to replace, nor is it so designed, any portion of the normal equipment installed by manufacturers to secure a battery, in place, in a motor vehicle but is used in conjunction with and in addition to such equipment. The device is designed and constructed in such a manner that it will not be necessary to construct a different size device to fit and/or secure different size batteries or to render its installation difficult if not impossible. To secure the maximum benefit and protection from this apparatus it will be of necessity that the metal chosen to be used in the construction of the device be of such quality that will offer the most resistance to the application of metal saws and/or metal cutting tools when such equipment is applied to defeat the purpose of this apparatus.

The parts to the Battery Watchman are relatively few in number and do not require a great deal of knowledge or equipment to design and/or construct. The parts consist primarily of a pair of holddown slides, a retaining slide, a pair of holddown nuts, an adjustment rod and approximately four spacer. The parts are assembled in such a fashion as to fit over a battery after it has been installed in a motor vehicle by the manufacturer. The holddown slides are fitted into the retaining slide and adjusted in such a manner that the openings provided at each end of the holddown slide will fit over the top of the holddown bolts, which form a part of the standard equipment to secure a battery, the length of the holddown slide after they have been placed into the retaining slide will be determined by the width or length of the battery to be secured, after the holddown slides are in place spacers are used to adjust to the required height and then the holddown nuts, which are prepared with internal bores, are screwed onto the holddown bolts, the holddown nuts are each provided with an opening thru which the adjustment rod will be placed; the opening on the holddown nut which is to be placed at the opposite end from where provisions has been made to place a lock will be threaded from the inside so as to allow one end of the adjustment rod to be screwed therein; the holddown slide, which is to be placed at the end opposite to the holddown nut which is threaded, has integral therewith a section of metal attached at a right angle to the one end of the holddown slide, an opening is provided in the section to allow it to be aligned with a section of metal which is placed at a right angle to the adjustment rod and which is also provided with an opening; the purpose of this alignment is to allow a lock to be placed thru the holddown slide and the adjustment rod, the adjustment rod at its end which is to be screwed into the holddown nut is also threaded so as to allow the adjustment rod to be used at the desired length. After the openings of the adjustment rod has been aligned with the companion opening on the holddown slide a lock is used to secure the device.

The holddown bolts are those which are normally found on motor vehicles as standard equipment and are used to secure the battery in the vehicle; the normal battery tie-down equipment will not have to be removed or adjusted to install the Battery Watchman. The spacers are used to adjust the height of the holddown slides so as to accomodate the in place, existing equipment.

DETAILED DESCRIPTION OF DRAWING

Figure 1:
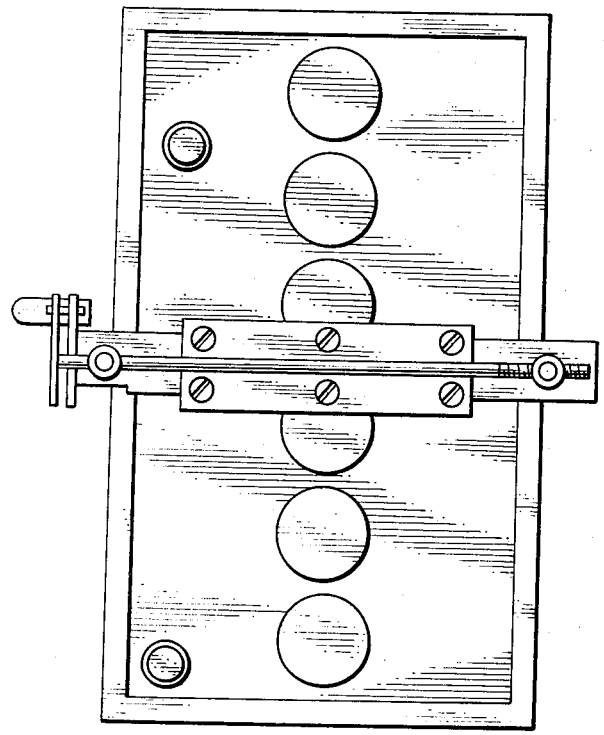
Figure 2:
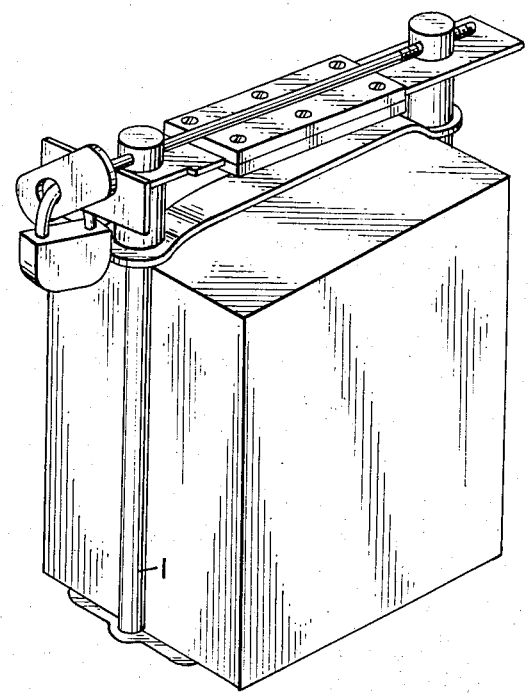
Figure 3:
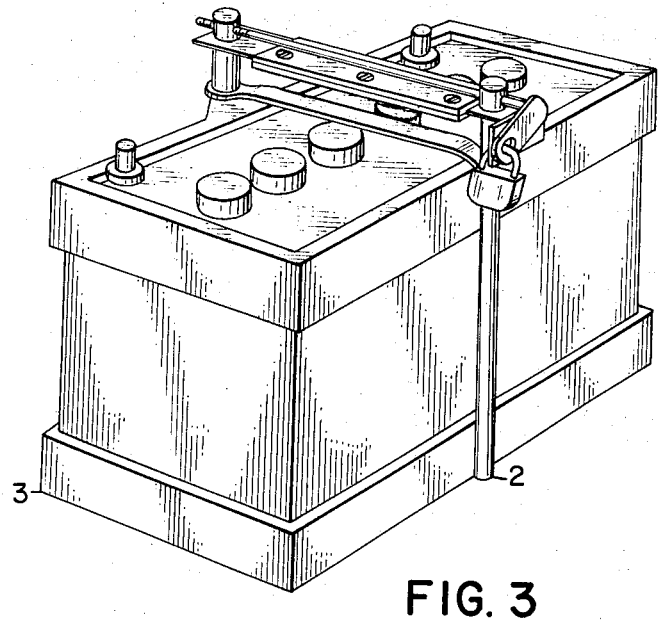
Figure 4:
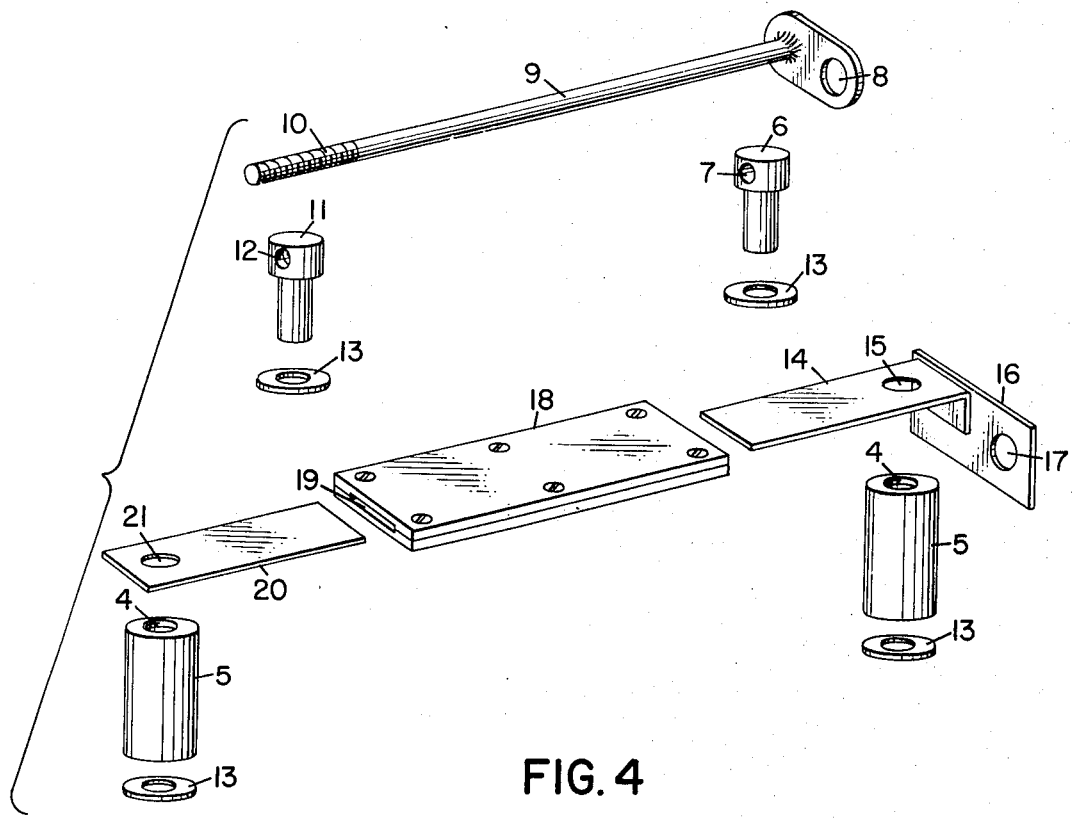
Figure 5:
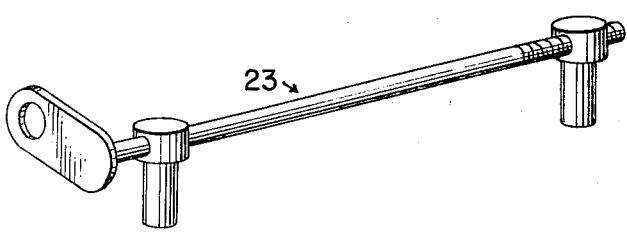
Figure 6:
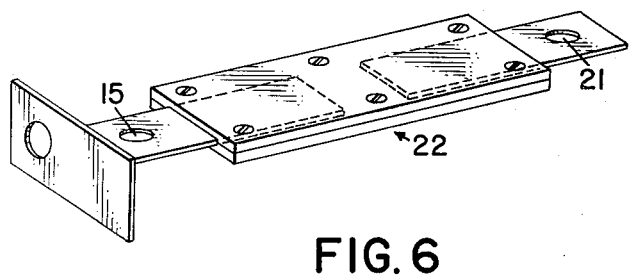
Figure 7:
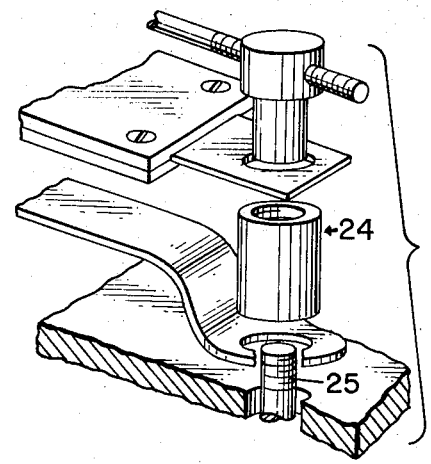

FIG. 1 is a plan view showing a battery with its standard holddown equipment and the locking means of my invention in place, FIGS. 2 and 3 are perspective views showing my battery locking device applied to batteries, with their standard holddown equipment, which are of different size and shape, FIG. 4 is a perspective, exploded, view of the parts which make up my battery locking device, FIG. 5 is a perspective view showing the operative relationship between the holddown nuts and adjusting rod, FIG. 6 is a perspective view showing the operative relationship between the retaining slide and the two holddown slides, and FIG. 7 is a perspective, exploded, view, partially in section, showing at one end only the relationship between the various parts of my battery locking device and a battery with its standard holddown bolt and crossbar. The drawing shows the following parts or portions of parts:

| | |
|---|---|
| 4 Spacer opening | 14 Holddown slide |
| 5 Spacer | 15 Opening in holddown slide |
| 6 Holddown Nut | 16 Attachment to holddown slide |
| 7 Opening in holddown nut | 17 Opening in attachment to holddown slide |
| 8 Opening in adjustment rod | 18 Retaining slide |
| 9 Adjustment rod | 19 Openings in retaining slide (both ends) |
| 10 Threaded end of adjustment rod | 20 Second holddown slide |
| 11 Second holddown nut | 21 Opening in second holddown slide |
| 12 Opening in second holddown nut | 22 View of holddown slide with retaining slide in place |
| 13 Washers or small spacers | 23 View of holddown nuts with adjusting rod in place |

The assembling and installation of the Battery Watchman is quite a simple process, the holddown slides (14) and (20) are inserted into the openings (19) provided in the retaining slide (18), the distance to which the holddown slides are inserted into the openings of the retaining slides is determined by the size and length of the battery to which the Battery Watchman is attached, after removing the nuts which are screwed onto the top of the holddown bolts (1) and (2). The holddown bolts are inserted thru the spacers (5), the smaller spacers (13) may also be used, such use in dependent upon the height one wishes to place the Battery Watchman above the standard equipment used to secure the battery, the retaining slide (18) with the holddown slides in place (22) is then placed in a position so that the openings in the retaining slides (15) and (21) are in perfect alignment with those in the spacers (4), see also (24). The holddown nuts (6) and (11) are then inserted thru the respective opening of the holddown slides (15) and (21) and the opening of the spacers (4) so as to be placed in a position to be screwed onto the top of the holddown bolt (25), the holddown nuts (6) and (11) are threaded in such as manner as to allow them to be screwed onto the holddown bolts (25), the adjustment rod (9) is then placed thru the opening of each holddown nut (7) and (12). Each of the holddown nuts are required to have openings (7) and (12) so as to allow the adjustment rod (9) to pass thru the tops of the holddown nuts (6) and (11), one of the holddown nuts (12) must be machined in a manner as to allow the threaded end of the adjustment rod (10) to be screwed thru the top of the nut. The adjustment rod is threaded on one end (10) to aid in the securing the Battery Watchman and to aid in the adjustment of the size of the Battery Watchman to fit batteries of different sizes or to accommodate some batteries which are secured across its middle while others may be required to be secured from end to end. The holddown slide (14) is placed in the opening (19) of the retaining slide (18) in such a manner that the section of the holding slide (16) which is at right angle to the base of the holding slide (14) will be placed in a position parallel to the side of the battery, the holddown slides (14) and (20) are placed into the retaining slide (18) in the manner as shown in the illustration (22), the holddown slide (14) that contains the opening of (17) of that section of the holddown slide (14) which is at right angle (16) to the base of the holddown slide and the opening (8) in the adjustment rod (9) are placed in such a manner as to allow each opening (8) and (17) to be aligned with each other, after each of the openings are aligned a lock is placed thru these openings as shown by the view in FIG. 3.

I claim:

1. A battery securing device which is comprised of the following:
   a. a pair of holddown slides both of which are provided with an opening for the purpose of allowing each holddown slide to be fitted over holddown bolts; one of the holddown slides has an additional section attached thereto; this section also is provided with an opening for the purpose of allowing the normal moveable portion of a padlock to be passed thru the opening and then secured;
   b. a retaining slide which provides at each end and throughout the length of the slide an opening to allow each of the holddown slides to be inserted into the retaining slide; the holddown slides and retaining slide are thus adjustable to the required length;
   c. a pair of holddown nuts which are machined in such a manner as to allow each holddown nut to be screwed onto the respective holddown bolt after the retaining slide and holddown slides have been placed over the battery, each of the holddown nuts is provided with an opening for the purpose of allowing an adjustment rod to be passed thru each opening, one of the holddown nuts having the opening machined in such a manner as to allow the adjustment rod to be screwed into and thru the holddown nut, this provides a manner in which the device can be adjusted to different size batteries;
   d. an adjustment rod which is machined in such a manner as to allow it to pass thru the opening provided in each of the holddown nuts and to allow it to be screwed into and thru said one of the holddown nuts; adjustment rod further provides a section of metal attached to the rod at a right angle and has an opening therethrough; the opening in the adjustment rod is aligned with the opening in one of the holddown slides in such a manner as to allow the shackle of a padlock to pass thru each opening.

2. A battery securing device as defined in claim 1 further comprising two spacers and washers which are insertable, one each, on to the holddown bolts prior to insertion of the holddown slide and retaining slides assembly for the purpose of allowing adjusting the height of the device to allow the device to be fitted above the top of a battery in such a manner as not to interfere with any standard equipment used to secure the battery or to require the removal of any standard equipment.

* * * * *